3,556,813
FROZEN CONFECTION

Norman S. Creswick, Cresskill, N.J., assignor to Thomas J. Lipton, Inc., Englewood Cliffs, N.J., a corporation of Delaware
No Drawing. Filed Dec. 8, 1967, Ser. No. 688,982
Int. Cl. A23g 5/00
U.S. Cl. 99—136          6 Claims

ABSTRACT OF THE DISCLOSURE

A low fat or fat-free frozen confection having good texture and stable structure is provided by whipping an aqueous solution containing heat coagulable protein solids to form a foam with the protein in the continuous phase, coagulating the protein in the foam by subjecting it to electromagnetic radiation in wave length bands normally used for induction, dielectric and microwave heating, for a time sufficient to provide a stable non-rubbery structure in the foam and freezing the resulting stable foam.

---

This invention relates to frozen confections and more particularly to a low fat, high protein frozen confection of superior characteristics.

Frozen confections are generally of several well recognized varieties, including ice-cream prepared from dairy and non-dairy sources, as well as ices. The confections of the ice-cream type may be whipped during their preparation prior to and during freezing in order to increase the volume of the confection and to minimize the formation of large ice-crystals during the freezing process. Most of these confections, however, will collapse upon melting and return to their original fluid or semi-gelled state.

The frozen confection of the present invention is prepared by first whipping an aqueous solution containing heat coagulable protein solids, preferably at a level of from 12–40% by weight of combined egg white solids and water to form a foam. The whipping is generally carried out to provide from about 150% to about 400% over-run. The foam is then formed into the desired shape, coagulated by subjecting it to electromagnetic radiation in wave length bands normally used for induction, dielectric and microwave heating, for a time sufficient to provide a stable non-rubbery structure in the foam, and then frozen.

The coagulated protein structure is maintained during storage of the frozen confection and continues to be stable upon thawing, thereby retarding or completely eliminating the undesirable dripping which occurs if a frozen confection is not consumed immediately after removing it from a low temperature environment.

The heat coagulable protein solids used in preparing the frozen confection of the present invention is preferably egg white solids, although other heat coagulable protein, such as a heat coagulable soy protein preparation may be used if desired. The egg white solids are preferably used at a level of from 12–40% by weight of the composition of egg white and water.

Various sugars may be used to flavor the confection. Where sucrose is employed, a level of 10–15%, based on the weight of the final composition, is preferred. Other sugars, such as glucose, dextrose, invert sugar, lactose and the like may be employed if desired. Furthermore, the sugar may be eliminated and the sweetness may be provided by non-nutritive sweeteners, such as saccharin, calcium cyclamate, and the like.

It is also preferred in accordance with this invention that thickening agents be used to help prevent syneresis of liquids from the confection on thawing. One preferred material is guar gum which may be employed at a level from 0.25 to 1% by weight of its water solution. Carrageenan may also be employed preferably at a level of from 0.5% to 2.5% by weight of its water solution. Non-gum thickeners, such as wheat flour, starches, soluble food-grade cellulose, and polyvinyl alcohol, are suitable alternatives to guar and carrageenan.

While the confection of this invention may be made without fats, an overall improvement in the eating quality and texture of the product is realized when a fat is used at a low level. Cottonseed oil, hydrogenated cottonseed oil, and commercial mixtures of mono- and di-glycerides have all been used with equally good results at a level of from 1–2% by weight of the whipped foam composition including sugar and thickener. The fat at this level has the effect of tenderizing the foam and brings about an improvement in the eating quality of the confection.

When preparing the confection of this invention, all the ingredients except the fat are combined and whipped in a high speed mixer until the desired over-run is achieved. An over-run of 150% to 400% is preferred. The fat is then added by folding it into the whipped aqueous phase by brief mixing, care being taken to avoid unnecessary collapse of the foam. Where the fat has a high melting point, it is preferably melted before it is folded in to insure a homogeneous mixture.

Following the preparation of the foam, it is filled into containers of desired shape and then subjected to electromagnetic radiation conditions which cause coagulation of the heat coagulable protein. In the non-fat systems, different considerations apply than in the fat containing systems. Under otherwise identical conditions, the fat-containing system requires a somewhat longer period of exposure than the non-fat system for the same texture requirements.

Setting of the coagulable protein is preferably achieved by subjecting the foam to microwave energy or other highly penetrative and easily absorbed electromagnetic form of energy. Induction and dielectric heating may also be used. The texture of the final product depends upon the extent to which the protein is coagulated. This in turn depends upon the foam mass and the power output of the energy source. Generally, the desirable extent of coagulation is obtained in from 3 to 20 seconds with microwave energy as derived from a conventional radar range.

It is known that coagulation of heat coagulable protein proceeds in stages from slight to moderate to full. Slightly coagulated protein sols are tender while fully coagulated materials may be rubbery, tough and thus undesirable.

In experiments using a 2 kw. oven of a Raytheon radar range, twelve 5 oz. cups of foam of this invention represent a ¼ lb. load. In order to achieve a desirable ice-cream type texture in the non-fat system with this oven and the indicated load, a heating cycle of between 3–8 seconds was required. Heating times less than this range provided insufficient coagulation for structural strength whereas heating time in excess of the range provided undesirable tough and rubbery materials.

On the other hand, when preparing a fat containing composition, and again using the same radar oven and loading, a heating cycle between 5 and 15 seconds gives satisfactory results.

The following examples are given to further illustrate the invention.

EXAMPLE I

The following composition was prepared and whipped to a 400% over-run:

| Ingredient: | Level, grams |
|---|---|
| Fresh egg white | 330 |
| Powdered sucrose | 60 |
| Vanilla sugar | 5 |
| Gum guar | 1 |

Twelve 5 oz. cups of the resulting foam was placed in a 2 kw. oven of a Raytheon radar range and heated for 8 seconds. The confection cups were then frozen in a blast freezer.

The resulting product was a frozen confection having an ice-cream texture and which on thawing lost little or no liquid due to syneresis.

A similar product was made following the procedure and formula set forth above, only substituting carrageenan at a 0.5 gram level for the gum guar. A frozen confection was obtained which had an ice-cream texture and which, on thawing, lost little or no liquid due to syneresis.

EXAMPLE II

A parfait confection according to this invention was was prepared by combining 40 grams of spray-dried egg white, 128 grams of water, 30 grams of sucrose and 5 grams of wheat flour, and whipping the mixture to 400% over-run. Nine grams of cottonseed oil was carefully folded into the foam and the foam was loaded into 5 oz. cups. Twelve of these cups were placed in the oven of the radar range described in Example I and the cups were heated for varying times, ranging from 5 to 15 seconds. The products were then frozen.

Evaluation of the frozen confections revealed that the products heated for 5 seconds and for 10 seconds had a good ice-cream like texture, whereas the product heated for 15 seconds had a poor texture of a rubbery nature.

EXAMPLE III

A chocolate flavored composition according to this invention was prepared by combining 30 grams of spray-dried egg white, 128 grams of water, 30 grams of sucrose, 40 grams of cocoa powder and 5 grams of wheat flour, and whipping to 400% over-run. Nine grams of cottonseed oil was then folded into the foam and the foam was loaded into 5 oz. cups. The cups of foam were heated for 10 seconds in the radar range described in Example I and then frozen. The resulting product had excellent ice-cream type texture and was free from syneresis on melting.

I claim:
1. A method of making a frozen confection comprising preparing an aqueous solution containing from 12% to 40% by weight of heat coagulable protein solids, whipping the solution to provide an over-run of from 150% to 400%, coagulating the protein in the whipped foam by subjecting it to electromagnetic radiation in wave length bands generally used for induction, dielectric and microwave heating, for a time sufficient to cause coagulation thereof to provide the composition with a stable non-rubbery structure, and freezing the resulting product.

2. A method of making a frozen confection comprising preparing an aqueous solution comprising from 12% to 40% by weight of heat coagulable protein solids, whipping the solution to provide an over-run of from 150% to 400%, folding into the foam from 1% to 2% by weight of fat, coagulating the protein in the whipped foam by subjecting it to electromagnetic radiation in wave length bands generally used for induction, dielectric and microwave heating, for a time sufficient to cause coagulation thereof to provide the composition with a stable non-rubbery structure, and freezing the resulting product.

3. A method of making a frozen confection which comprises preparing an aqueous solution containing from 12% to 40% by weight of egg white solids, based on combined weight of egg white solids and water, and from 10% to 15% of sucrose by weight, basis final composition, whipping the solution to provide an over-run of from 150% to 400%, coagulating the egg white by subjecting it to microwave energy sufficient to provide a stable non-rubbery structure, and freezing the resulting product.

4. A method of making frozen confection comprising preparing an aqueous solution containing from 12% to 40% by weight of egg white solids, basis combined egg white solids and water, from 10% to 15% by weight of sucrose, basis final composition, and an effective amount of a thickening agent, whipping the solution to provide an over-run from 150% to 400%, the protein being in the continuous phase, coagulating the protein of the continuous phase by subjecting it to microwave energy sufficient to provide a stable non-rubbery structure in the foam and freezing the resulting product.

5. The method of claim 4 wherein from 1% to 2% by weight of fat is folded into the foam prior to the heat coagulation step.

6. A frozen confection prepared in accordance with the process of claim 1.

References Cited

UNITED STATES PATENTS 3,111,408  11/1963  Cheng _____ 99—14

OTHER REFERENCES

Nichols, ed.: Freezing and Canning Cookbook, Doubleday & Co., Inc., New York, 1963, pp. 102, and 119–120.

RAYMOND N. JONES, Primary Examiner

J. M. HUNTER, Assistant Examiner